United States Patent
Abzarian et al.

(10) Patent No.: US 9,405,379 B2
(45) Date of Patent: Aug. 2, 2016

(54) CLASSIFICATION OF USER INPUT

(71) Applicant: Microsoft Technology Licensing, LLC, Redmond, WA (US)

(72) Inventors: David Abzarian, Kenmore, WA (US); Ross W Nichols, Seattle, WA (US); Fei Su, Issaquah, WA (US); Mudit Agrawal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 13/917,608

(22) Filed: Jun. 13, 2013

(65) Prior Publication Data

US 2014/0368436 A1    Dec. 18, 2014

(51) Int. Cl.
  *G06F 3/02*   (2006.01)
  *G06F 3/0488*   (2013.01)
  *G06F 3/038*   (2013.01)
  *G06F 3/041*   (2006.01)
  *G06F 3/01*   (2006.01)

(52) U.S. Cl.
  CPC .............. *G06F 3/0227* (2013.01); *G06F 3/017* (2013.01); *G06F 3/038* (2013.01); *G06F 3/0418* (2013.01); *G06F 3/0488* (2013.01)

(58) Field of Classification Search
  CPC combination set(s) only.
  See application file for complete search history.

(56) References Cited

U.S. PATENT DOCUMENTS

| | | | |
|---|---|---|---|
| 6,597,345 | B2 | 7/2003 | Hirshberg |
| 8,199,126 | B1 | 6/2012 | Taubman |
| 2007/0152976 | A1 | 7/2007 | Townsend et al. |
| 2010/0103117 | A1* | 4/2010 | Townsend et al. ............ 345/173 |
| 2010/0127995 | A1 | 5/2010 | Rigazio et al. |
| 2010/0225595 | A1 | 9/2010 | Hodges et al. |
| 2010/0245258 | A1 | 9/2010 | Stewart et al. |
| 2012/0169611 | A1 | 7/2012 | Chen |
| 2012/0242617 | A1 | 9/2012 | Lee |
| 2012/0262407 | A1 | 10/2012 | Hinckley et al. |
| 2012/0324403 | A1 | 12/2012 | Van De Ven et al. |
| 2013/0027336 | A1 | 1/2013 | Liu |
| 2015/0130742 | A1* | 5/2015 | Chen et al. .................... 345/174 |

OTHER PUBLICATIONS

PCT Search Report for PCT Application No. PCTIUS2013/061034, mailed Feb. 6, 2014 (11 pages).
Forlines, et al., "Glimpse: A Novel Input Model for Multi-level Devices", In Proceedings of Extended Abstracts on Human Factors in Computing Systems, May 2005, 6 pages.

* cited by examiner

*Primary Examiner* — Van Chow
(74) *Attorney, Agent, or Firm* — Timothy Churna; Judy Yee; Micky Minhas

(57) ABSTRACT

Techniques for identifying inadvertent user input, such as inadvertent touch contact or air input, are described. The techniques may include classifying a touch contact or air input as intentional or unintentional based on contextual information related to the touch contact, the air input, or a device via which the touch contact or air input was received. In some examples, the contextual information may indicate how a user is interacting with the device, such as a position of the user's hand, a location of the touch contact on a touch surface, a path of user's touch trajectory, an application with which the user may be interacting, keyboard input history of the user, and so on. When the user input is classified as unintentional, the techniques may refrain from performing an action that is generally triggered by the user input.

19 Claims, 8 Drawing Sheets

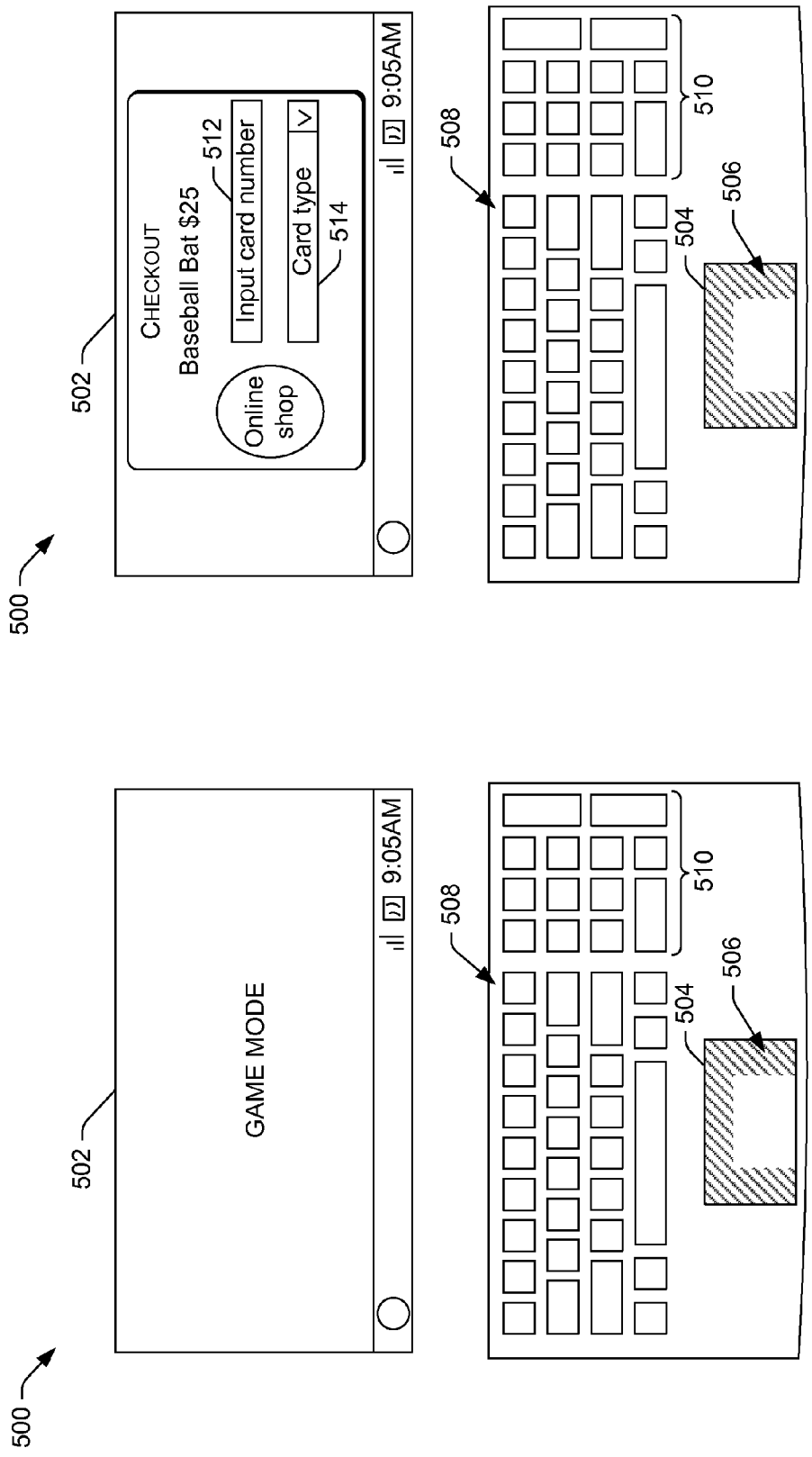

CLASSIFICATION OF USER INPUT

BACKGROUND

Many computing devices utilize touch surfaces, such as touch pads and touch screens. These touch surfaces receive input from a user or item that causes the computing device to perform an action, such as selecting an icon, scrolling through a page, and so on. In some instances, the user or item may inadvertently contact the touch surface, triggering the performance of an inadvertent action. For example, a user that is typing on a keyboard of his laptop may unintentionally rest the palm of his hand on a touch pad, causing unintended input to be received through the touch pad. As a growing number of computing devices are equipped with touch surfaces and other input devices, there is an increasing need to accurately identify intended input.

SUMMARY

This disclosure describes, in part, techniques and architectures for identifying inadvertent user input, such as inadvertent touch contact or air input. In some instances, the techniques include receiving an indication of user input and classifying the user input as intentional or unintentional. The user input may include, for example, a touch contact received through a touch surface, air input detected by a camera, and so on. The user input may be classified based on contextual information related to the user input or a device through which the user input was received. In some examples, the contextual information may indicate how a user is interacting with the device, such as a position of the user's hand, a location of a touch contact on a touch surface, an application with which the user may be interacting, keyboard input history of the user, and so on. When the user input is classified as unintentional, the techniques may refrain from performing an action that is generally triggered by the user input. By utilizing contextual information, the techniques may accurately identify inadvertent user input and may avoid performance of unintentional actions.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5A and 5B illustrate example techniques for classifying touch contacts based on application information related to applications that are currently running.

DETAILED DESCRIPTION

Figure 1:
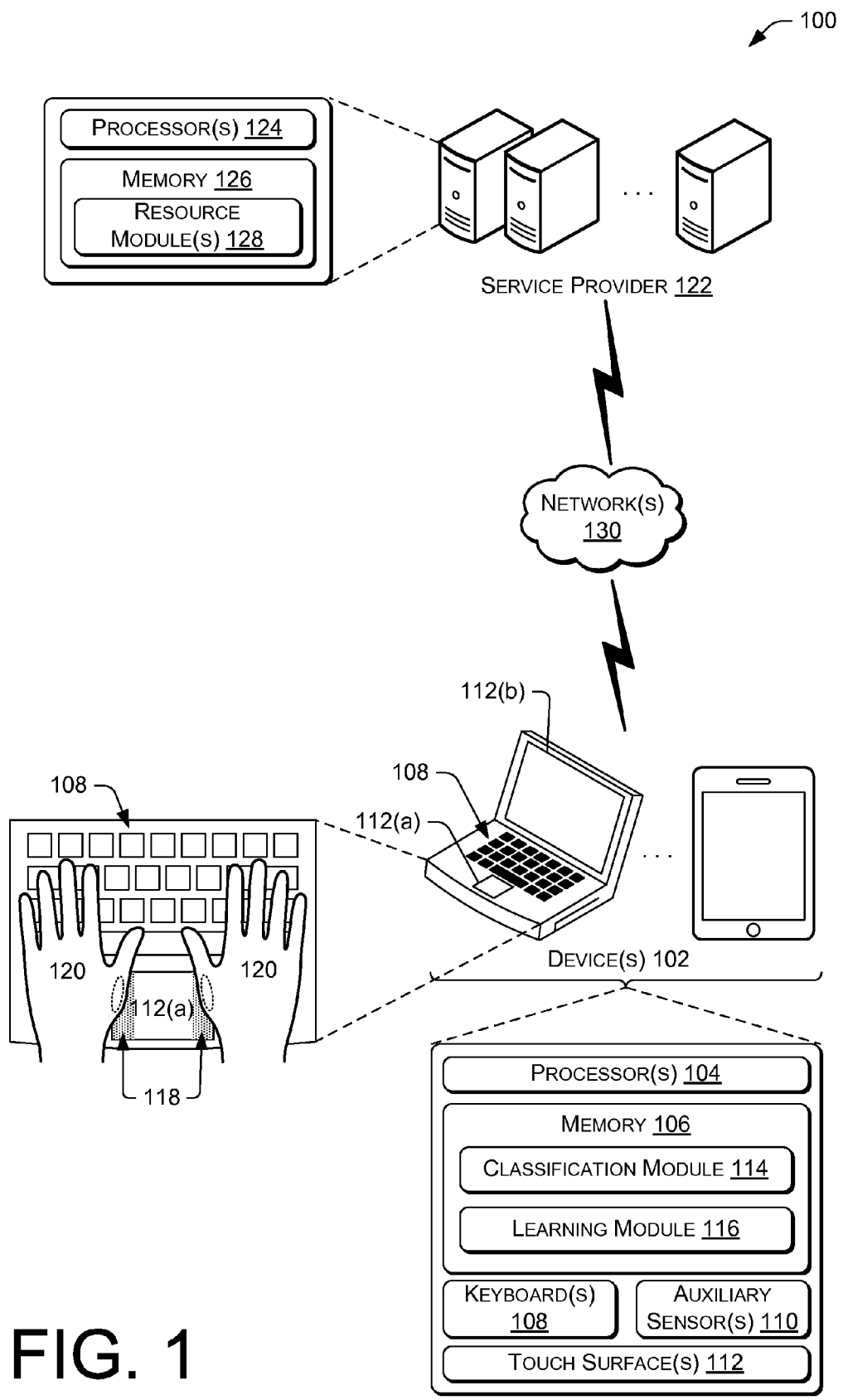
FIG. 1 illustrates an example architecture in which techniques described herein may be implemented.

In many devices an unintentional contact on a touch surface or other type of input device may trigger the performance of an unintended action. This may generally provide a poor experience to a user of the device. As more devices are equipped with touch surfaces and other types of input devices, there is an increasing need to accurately identify intended input.

This disclosure describes techniques and architectures for identifying inadvertent user input, such as inadvertent touch contact or air input. In one implementation, a device may receive a touch contact via a touch surface of or connected to the device, such as a touch pad or a touch screen. The touch contact may be received from a user's finger or other part of a hand, a stylus, or any other object or part of a user that may be detected. The touch contact may be classified based on contextual information related to the touch contact or the device. The contextual information may provide a rich source of information to infer the intent of the user that caused the touch contact. When the touch contact is classified as unintentional, the device may refrain from performing an action that is generally triggered by such contact.

For example, when the contextual information indicates that the touch contact is received within a predetermined portion of the touch surface that is associated with unintentional contact (e.g., a portion along a perimeter of the touch surface), the touch contact may be classified as unintentional and the associated action may be avoided. In another example, when the contextual information indicates that input has not been received through a keyboard over a period of time (e.g., indicating that a user has finished typing), the touch contact may be classified as intentional and the associated action may be performed. In yet another example, when the contextual information indicates that a particular type of application or field control is active (e.g., a word processing application is running or a text input field is selected to receive keyboard input), the touch contact may classified as unintentional and the associated action may be avoided.

In some instances, the touch contact may be subjected to an additional classification once further information is collected about the touch contact. The information may indicate a duration of time that the touch contact was on the touch surface, a velocity of the touch contact on the touch surface, and/or a path of the touch contact on the touch surface. If the information indicates that the touch contact was incorrectly identified as intentional, the action that was triggered by the touch contact may be recalled (e.g., the action may be undone).

Although in the example discussed above, and in many of the examples below, the techniques are discussed in the context of touch contacts, the techniques may apply to other types of user input, such as air input. As used herein, "air input" may refer to any type of input that is received without contacting a surface (e.g., an air gesture).

By classifying user input as intentional or unintentional based on contextual information, the techniques and architectures may utilize a rich source of information to evaluate user input. This may allow inadvertent user input to be suppressed and avoid performance of unintentional actions, which may ultimately enhance the user's experience. Further, by providing an additional classification once further information is gathered about the user input and, if necessary, recalling a previously performed action, the techniques and architectures may provide a responsive user experience that adapts as additional information is gathered.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. It is to be appreciated, however, that the following implementations and contexts are only examples of many.

Example Architecture

FIG. 1 illustrates an example architecture 100 in which techniques described herein may be implemented. The architecture 100 includes one or more devices 102 (hereinafter "the device 102") configured to identify inadvertent user input (e.g., touch contact, air input, etc.) and perform other operations. For example, the device 102 may evaluate contextual information associated with a touch contact and/or the device 102 to classify a touch contact as intentional or unintentional. When the touch contact is classified as intentional, the device 102 may perform an action that is associated with the touch contact, such as selecting an interface element, moving a mouse pointer or cursor, scrolling on a page, and so on. In contrast, when the touch contact is classified as unintentional, the associated action may not be performed.

The device 102 may comprise a laptop computer, a desktop computer, a smart phone, an electronic reader device, a mobile handset, a personal digital assistant (PDA), a portable navigation device, a portable gaming device, a game console, a tablet computer, a watch, a portable media player, and so on. In some instances, the device 102 may comprise a mobile device, while in other instances the device 102 may comprise a stationary device.

The device 102 may be equipped with one or more processors 104, memory 106, one or more keyboards 108 (hereinafter "the keyboard 108"), one or more auxiliary sensors 110 (hereinafter "the auxiliary sensor 110"), and one or more touch surfaces 112 (hereinafter "the touch surface 112"). Although not illustrated in FIG. 1, the device 102 may also include or be associated with one or more network interfaces, displays, peripheral devices (e.g., a mouse, a non-integrated keyboard, a joystick, etc.), and other elements. The one or more processors 104 may include a central processing unit (CPU), graphics processing unit (GPU), a microprocessor, and so on. Alternatively, or in addition, the techniques described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some instances, the keyboard 108 includes a set of mechanical or pressure-sensitive buttons, while in other instances the keyboard 108 may be implemented through a touch screen or other type of touch surface. The buttons of the keyboard 108 may include alphanumerical keys (e.g., letters or numbers), control keys (e.g., shift, enter, F1-F12, esc, etc.), or any other type of key. The auxiliary sensor 110 may comprise a proximity sensor that detects a proximity of objects to the device 102 (e.g., a sensor that detects a user gripping the device 102, etc.), a presence sensor, an infrared (IR)/thermal sensor, a Wi-Fi® sensor, a camera, a microphone, and so on. In some instances, the camera and/or microphone may act to detect proximity of an object to the device (e.g., by analyzing video or audio of objects that are in proximity to the device).

The touch surface 112 may comprise any type of digitizer configured to detect a touch contact. The detection may be based on capacitive, optical, or any other sensing technique. In one example, the touch surface 112 includes a touch pad 112(a) (also known as a track pad) having a tactile sensor to sense touch, pressure, and/or force (of an area of contact). Alternatively, or additionally, the touch surface 112 may include a touch screen 112(b). In some instances, the touch surface 112 may be implemented as a device that includes a touch pad and a mouse (e.g., a combination touch pad-mouse device external to or integrated with the device 102). Further, in some instances the touch screen 112(b) may be implemented as a display configured to display content, while the touch pad 112(a) may not be configured to display content.

The memory 106 may include software functionality configured as one or more "modules." The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface), firmware, and so on. As illustrated in FIG. 1, the memory 106 includes a classification module 114 and a learning module 116.

The classification module 114 may classify user input (e.g., touch contacts, air input, etc.) received through the device 102 (e.g., touch surface 112). The classification may be based on contextual information and/or other types of information. In one example illustrated in FIG. 1, a portion 118 of the touch surface 112(a) may be associated with a higher degree of inadvertent contact, in comparison to other portions of the touch surface 112(a) (e.g., a central portion with no shading). If contextual information, namely location information of a touch contact, indicates that a user's hand 120 contacts the portion 118 of the touch surface 112(a), then the classification module 114 may classify the touch contact as inadvertent. In FIG. 1, the dotted ellipses of the hands 120 illustrate a portion of the hands 120 that may contact the touch surface 112(a). In another example, a classification may be based on how recently input was received through the keyboard 108. If, for example, input has been received through the keyboard over a period of time (e.g., over a last second), this may indicate that the user is still typing and touch contact that is received through the touch surface 112(a) may be classified as inadvertent. Other examples of classifying touch contact will be discussed below.

The learning module 116 may learn information related to a user's interaction with the device 102. For example, the learning module 116 may learn an average typing rate of the user (e.g., a number of key strokes per unit time), characteristics about the user's hands (e.g., a size of the tips of the user's fingers, a palm size, etc.), how often after typing the user uses the touch surface 112, and so on. This information may be utilized to create a personalized user experience for the touch surface 112 and/or other input devices. To illustrate, by learning a size of a tip of a user's finger, the classification module 116 may accurately identify inadvertent touch contact as touch contact that is larger than the size of the tip of the user's finger. Other examples of learning information will be discussed below.

Although many of the example techniques herein discuss user input as corresponding to a touch contact, the techniques may similarly apply to other types of user input, such as air input. As used herein, "air input" may refer to any type of input that is received without contacting a surface (e.g., through the air). In one instance, air input comprises an air gesture, such as a user waving a hand to initiate an action, a user holding a hand in a particular orientation or manner (e.g., making a first or thumbs-up), or any other type of bodily action or positioning. As such, in some instances the device 102 may include and/or be associated with cameras, sensors (e.g., IR sensors), microphones, or other devices to detect air input. In one example, the device 102 includes a camera to detect bodily actions of a user.

As illustrated in FIG. 1, the architecture 100 may also include a service provider 122 to provide one or more services to the device 102. The service provider 122 may include one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, storage resources, and the like, that operate remotely to the device 102.

The service provider 122 may be equipped with one or more processors 124 and memory 126. The memory 126 may include one or more resource modules 128 (hereinafter "the resource module 128") that provide resources to the device 102. For example, the resource module 128 may maintain information that is learned by the learning module 116. This may include receiving the information from the device 102 and/or sending the information to another device so that a user may utilize the other device with the learned information, such as in a case where as user purchases a new device and wishes to transfer over learned information to the new device. In another example, the resource module 128 may comprise a cloud-based operating system that provides operating system and/or other functionality to the device 102. While not illustrated in FIG. 1, the service provider 122 may also include one or more network interfaces and other elements.

Although in the example architecture 100 of FIG. 1 the modules 114 and 116 are illustrated as being included in the device 102, one or more of these elements, as well as any of the elements of the device 102 discussed herein, may be included in the service provider 122. As such, in some instances the device 102 may act as an input/output device that receives user input and outputs content, while the service provider 122 performs functions for classifying user input, learning information, and other operations.

The memory 106 and/or 126 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The device 102 and service provider 122 may communicate via one or more networks 130. The one or more networks 130 may include any one or combination of multiple different types of networks, such as cellular networks, wireless networks, Local Area Networks (LANs), Wide Area Networks (WANs), Personal Area Networks (PANs), and the Internet.

Example Device

Figure 2:
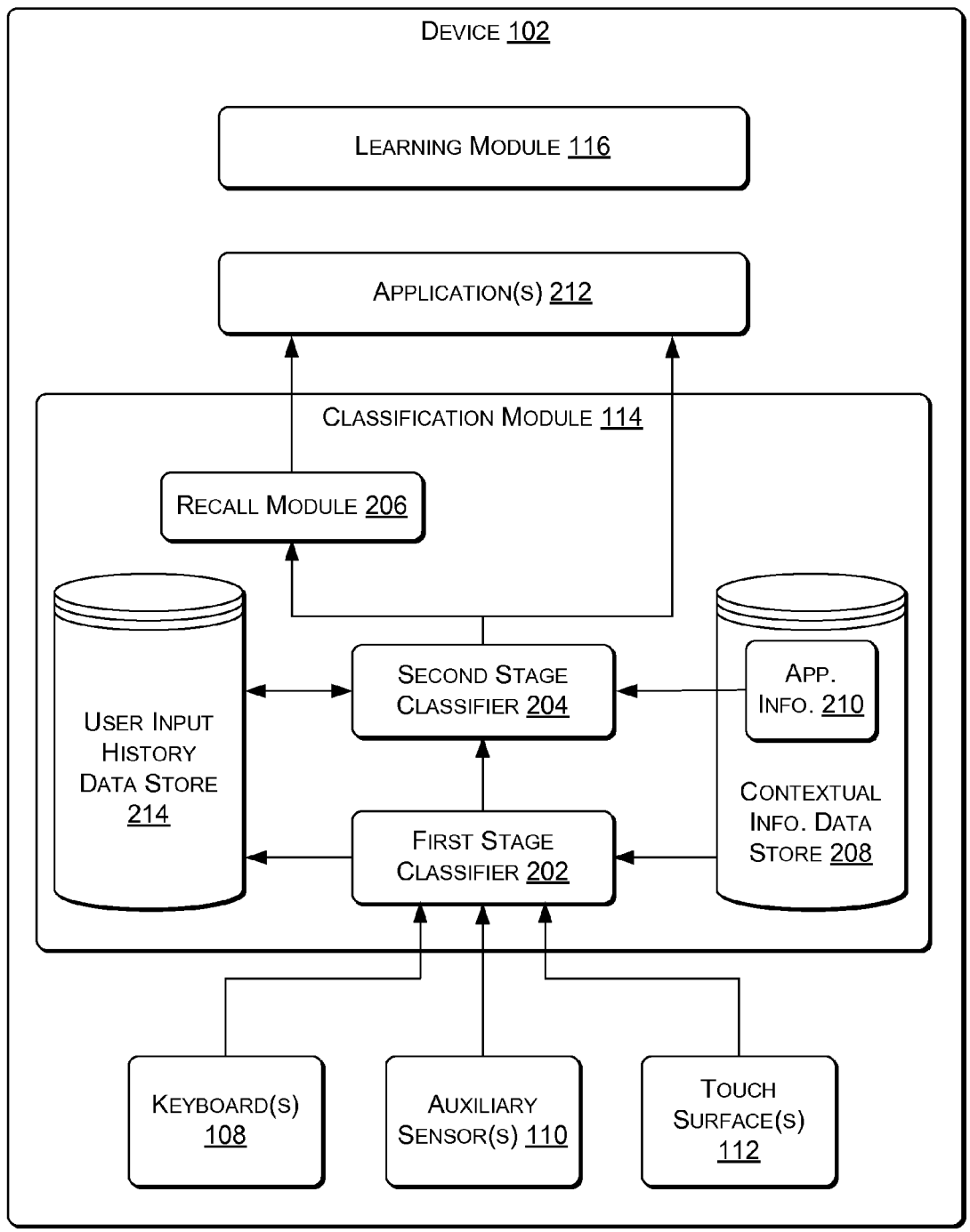
FIG. 2 illustrates example details of a device of FIG. 1.

FIG. 2 illustrates example details of the device 102 of FIG. 1. In particular, FIG. 2 illustrates details of one example implementation of the classification module 114 and learning module 116 of the device 102. In this implementation, the classification module 114 is implemented with a first stage classifier 202 (e.g., module), a second stage classifier 204, and a recall module 206. In general, the goal of the first stage classifier 202 may be to make decisions relatively quickly (e.g., without delay) with readily available information. In some instances, the first stage classifier 202 may err towards classifying input as intentional, so as to avoid discarding a valid input in the first stage when a relatively small amount of information is available. Meanwhile, the goal of the second stage classifier 204 may be to make decisions based on more information than that which was available to the first stage classifier 202 (e.g., more context). This may come at an expense of waiting longer to collect the additional information. However, in some instances the second stage classifier 204 may provide a more accurate decision than the first stage classifier 202, due to a larger amount of information that is used in the second stage for a classification.

The first stage classifier 202 may receive input information from the keyboard 108, the auxiliary sensor 110, the touch surface 112, and/or any other device (e.g., a camera). When information is received from the touch surface 112 or other devices that describes user input (e.g., a touch contact), the first stage classifier 202 may analyze contextual information related to the user input and/or the device 102 to determine an initial classification of the user input. The initial classification may indicate whether or not the user input was intentional. The contextual information may be provided by the keyboard 108, the auxiliary sensor 110, the touch surface 112, and/or another device, and/or may be stored in a contextual information data store 208. Some examples of contextual information include:

Location information of the user input that indicates a location of the user input, such as a location of touch contact on the touch surface 112. If, for example, the user input is a touch contact, the location information may indicate whether or not the touch contact was received within a predetermined portion of the touch surface 112 (e.g., within the portion 118 of the touch surface 112(a)). The location of the touch contact may be referred to as an "absolute position" in that it provides a location of the touch contact relative to the touch surface 112 and not relative to content that is displayed (e.g., a mouse cursor relative to a display screen). In another example, if the user input is air input, the location information may indicate a location of the input relative to the device 102, such as a distance to the device 102, a position on a vertical plane or area at which a user makes air gestures, and so on. To illustrate, the location information may indicate that a user's hand is positioned above the user's head at a particular distance from the device 102. The location information may be provided by the touch surface 112 or any other device (e.g., a camera).

Geometry information of the user input that indicates a size or shape of the user input. For example, the geometry information may indicate that a touch contact is substantially rectangular or elliptical and provide the dimensions of the shape (e.g., height and width of a rectangle). In some instances, the geometry information may be represented by a bounding box around the user input (e.g., touch contact). The geometry information may be provided by the touch surface 112 or any other device (e.g., a camera).

Pressure information of a touch contact that indicates an amount of pressure that is applied to make the touch contact. The pressure information may be provided by the touch surface 112.

A confidence value of the user input determined by a device that received the user input, such as the touch surface 112 (e.g., a confidence bit). For example, the confidence value may indicate a likelihood that a touch contact is intentional and may be determined around the time the touch contact was received at the touch surface 112.

Information that indicates a number of substantially simultaneous user inputs, such as a number of simultaneous touch contacts on the touch surface 112. This information may be provided by the touch surface 112 or another device.

Hand position information that indicates a position of a hand of a user relative to the device 102. For examples, the auxiliary sensor 110 may provide information indicating that the user's hands are in close proximity to or contacting the keyboard 108, that the user is gripping the device 102 along the sides of the device 102, and so on. The position information may be provided from the keyboard 108, the auxiliary sensor 110, and/or the touch surface 112.

Application information 210 related to a program or an application that is currently or was recently running on the device 102. The application information may indicate a type of application that is running (e.g., a game application, a word processing application, an email application, or any other category of applications), content that is currently being displayed (e.g., video content is being displayed, user interface elements are being displayed, etc.), content of the application that is being interacted with (e.g., a type of field control to which input is being received), and so on. To illustrate, the application information 210 may indicate that the user is currently inputting text information into a text input field of a user interface. The application information 210 may be provided by one or more applications 212 of the device 102 (e.g., applications that are currently running).

Keyboard input history of the keyboard 108. The keyboard input history may indicate a time of a keystroke (e.g., the "k" key was pressed at 11:34:02 AM and 12 microseconds), a rate of keystrokes or words (e.g., the user averages 40 words-per-minute), a type of keystroke that is received (e.g., qualified, meaning alphanumerical keys, or non-qualified meaning other keys), a number of keystrokes that are received, an amount of time between entering words (e.g., the user pauses 10 ms between words), an amount of time between switching between different types of input keys (e.g., the user pauses 45 ms between entering letters and entering numbers), an amount of force with which keys of the keyboard 108 are pressed, and so on. In some instances, the classification module 114 may utilize keyboard input history to determine an amount of time between receiving input through the keyboard 108 and receiving input through the touch surface 112. In one example, this amount of time comprises an amount of time between receiving "qualified" keyboard input (e.g., alphanumerical keys) and receiving touch surface input. The keyboard input history may be gathered from the keyboard 108 and/or calculated by the classification module 114.

Peripheral device information related to a peripheral device (e.g., a mouse, joystick, camera, microphone, etc.). This information may indicate whether a peripheral device is connected or being used, how much the peripheral device is being used, a location of the peripheral device relative to the device 102, a velocity of movement of the peripheral device, and so on.

In one example of determining an initial classification of a touch contact, the first stage classifier 202 may classify the touch contact as intentional when keyboard input history indicates that less than a threshold number of keystrokes (e.g., qualified keystrokes) has been received prior to receiving the touch contact within a predetermined time (e.g., over a last two seconds before receiving the touch contact). In contrast, if more than the threshold number of keystrokes has been received before the touch contact is received, then the touch contact may be classified as unintentional. This threshold may be set by the user. In this example, the number of keystrokes may provide an indication as to how the user is interacting with the device 102. A relatively large number of keystrokes (e.g., above the threshold) may indicate that the user is in a typing session and did not intend to contact the touch surface 112, whereas a relatively small number of keystrokes may indicate that the user is entering data and intended to contact the touch surface 112.

Figure 3:
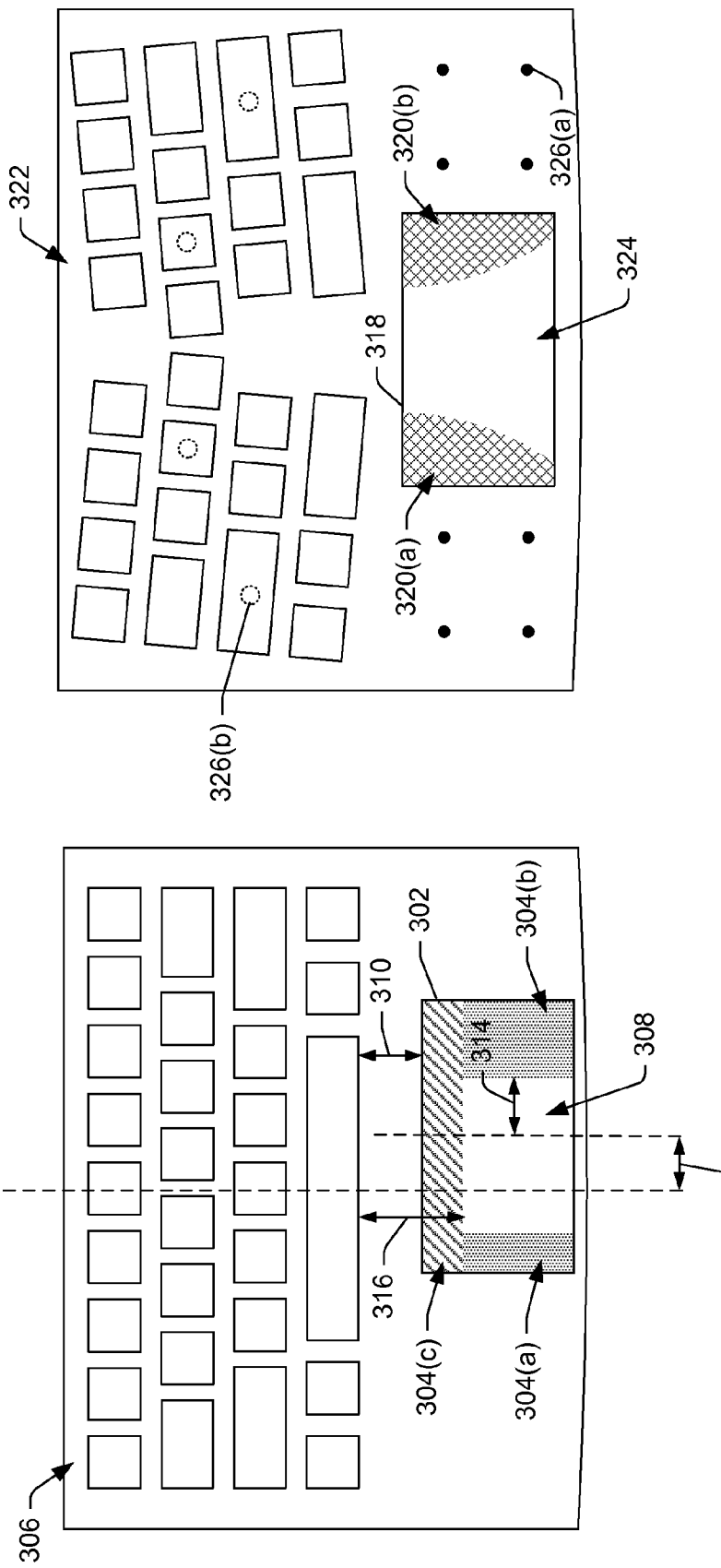
FIGS. 3A and 3B illustrate example techniques for classifying touch contacts that are received on devices with integrated touch pads and keyboards.

In another example, the first stage classifier 202 may classify a touch contact as unintentional when a number of simultaneous contacts on the touch surface 112 is greater than a threshold number (e.g., more than three). This may result in suppression of all the touch contacts (e.g., ignoring each of the contacts) or suppression of particular touch contacts (e.g., a first touch contact takes priority). In yet another example, a touch contact may be classified as unintentional when a confidence value from the touch surface 112 indicates that the touch contact was likely not intended and/or when pressure information indicates that the amount of pressure is less than a threshold. Other examples of classifying a touch contact will be discussed below in reference to FIGS. 3-5.

The second stage classifier 204 may determine whether a classification of user input made by the first stage classifier 202 is correct. In some instances, the second stage classifier 204 may analyze user input history stored in a user input history data store 214. As illustrated, the first stage classifier 202 may assist in formulating the user input history by providing information about user inputs to the user input history data store 214 (e.g., geometry information, location information, pressure information, etc.). With the user input history, the second stage classifier 204 may confirm or override a decision made by the first stage classifier 202. For example, an initial classification of a touch contact as intentional by the first stage classifier 202 may be overridden as unintentional by the second stage classifier 204 when user input history indicates that the touch contact did not contact the touch surface 112 for more than a threshold amount of time. In contrast, the initial classification of intentional may be maintained when the touch contact is present for more than the threshold amount of time. In another example, an initial classification of a touch contact as intentional, where the touch contact has not yet moved and thus, is not yet associated with a velocity, may be overridden as unintentional if, after the touch contact has moved, the user input history indicates that a velocity of the touch contact is greater than a threshold.

As illustrated in FIG. 2, the second stage classifier 204 may additionally, or alternatively, analyze application information 210 from the contextual information data store 208. For example, if after making an initial classification of a touch contact as intentional, the application information 210 is updated to reflect the actual status of an application at the time when the touch contact was received, the second stage classifier 204 may override or confirm the initial classification based on the application information 210. Although in the example of FIG. 2 the application information 210 is the only information from the contextual information data store 208 that is provided to the second stage classifier 204, any other information from the contextual information data store 208 may be provided.

The first and second stage classifiers 202 and 204 may work together to accurately identify inadvertent user input in an efficient manner. In some instances, an initial classification of user input as intentional at the first stage classifier 202 may immediately trigger an action to be performed, such as selecting an icon, opening an application, and so on. Thereafter, the second stage classifier 204 may confirm or override the initial classification as further information is gathered about the user input and/or the device 102. By doing so, the classification module 114 may provide a responsive experience to the user that adapts as quickly as information obtained.

In some instances, when the second stage classifier 204 determines that the first stage classifier 202 has incorrectly classified user input as intentional and triggered the performance of an action, the recall module 206 may perform processing to recall or undo the action. The recall module 206 may send instructions to cancel the action or otherwise undo the action. To illustrate, if an instruction was sent to refresh a display with new content in response to an initial classification of an intentional touch contact, and the refresh has not taken place yet, the recall module 206 may send an instruction to cancel the refresh if it is determined that the initial classification was incorrect. Here, this may avoid the user from noticing that an incorrect classification occurred. In another illustration, if an action has already been performed, such as zooming in on an item, the recall module 206 may cause the action to be reversed or undone, such as displaying the item before the zoom.

The first stage classifier 202 and/or the second stage classifier 204 may be implemented as a rule classifier or a statistical classifier. In a rule implementation, a rule may be defined for each characteristic (e.g., input) that is used for a classification. For example, geometry information of a touch contact may be compared with a threshold-based rule to determine whether an associated touch contact is intentional. If the geometry information indicates that a shape or size of the touch contact satisfies the threshold-based rule (e.g., is less than a threshold size), then the touch contact may be classified as intentional. In another example, hand position information may be compared to a threshold-based rule to determine whether or not a hand is located within a predetermined distance to a particular portion of the device 102 (e.g., a keyboard), which may indicate an intent of a touch contact (e.g., if a hand is located close to the keyboard, then the touch contact may be classified as unintentional).

Meanwhile, in a statistical implementation (e.g., statistical learning), a combination of characteristics (e.g., inputs) may be used to classify user input. Here, the characteristics may be weighted so that particular characteristics are given more importance than others. One way of doing this is to learn these weights using a machine learning approach. For example, a function may be used that includes multiple variables (e.g., characteristics) that correspond to the different types of contextual information, with each variable being weighted (e.g., function=$constant_1 \times variable_1 + constant_2 \times variable_2 + constant_3 \times variable_3 \ldots$). The value of the function may then be compared to a threshold to determine whether or not the user input is intentional or can be classified using a learning classifier. To illustrate, a function may be defined that sums a weighted variable of location information of a touch contact, a weighted variable of hand position information, and a weighted variable of keyboard input history. The sum may then indicate whether the touch contact was intentional or unintentional. In some instances, the sum may represent a probability that a touch contact was intentional. To illustrate, a function associated with a touch contact that has a sum that is greater than a threshold may indicate that the touch contact was intentional.

In some instances, a combination of characteristics may be updated to add variables and/or weightings as information about the variables and/or weightings is obtained (e.g., dynamically update). The update may occur in a personalized manner (e.g., update a function for a particular user) and/or across multiple users (e.g., update a global function for multiple users). In one example, a function that includes variables for pressure information and geometry information may be updated to include a variable for keyboard input history as keystrokes are pressed and keyboard input history is made available. In another example, a function for a particular user may be updated to include an increased weighting for keyboard input history, so that the keyboard input history has a greater impact in the function. The weighting update may occur in response to identifying that keyboard input generally indicates intent of touch contacts for that particular user. In some instances, by utilizing a combination of characteristics to classify user input, the user input may be classified in an intelligent manner that accounts for multiple types of contextual information. Further, the combination of characteristics may be further refined by dynamically updating variables and/or weightings of the combination.

As discussed above, the device 102 may also include the learning module 116 to learn information related to a user's interaction with the device 102 (e.g., interaction with the touch surface 112, the keyboard 108, etc.). This information may be utilized to create a personalized user experience for the touch surface 112 (e.g., adjusting thresholds for classifying input based on personal information). Examples of information that the learning module 116 may learn include:

An average typing rate of the user (e.g., a number of key strokes per unit time).

How often after typing the user uses the touch surface 112 or provides air input. In one example, this information may be useful for determining when to suppress touch contacts. To illustrate, if a user typically waits two second after typing to contact the touch surface 112, then the learning module 116 can learn that any contact on the touch surface 112 before the two seconds expire will be treated as unintentional touch contact.

Characteristics about the user's hands (e.g., size of the tips of the user's fingers, palm size, etc.). In one example, this information may be used to analyze geometry information of a touch contact. If, for example, a size of a tip of a user's finger is identified, touch contacts that are larger than the size of the tip of the user's finger may be classified as unintentional.

How a user holds a device (e.g., the user generally grips the right side of the device).

Any type of contextual information.

Example Touch Contact Classifications

FIGS. 3A and 3B illustrate example techniques for classifying touch contacts that are received on devices with integrated touch pads and keyboards. Although these techniques are discussed in the context of devices with integrated touch pads and keyboards, these techniques may be applied in other contexts, such as in cases where the keyboard is not so integrated. Further, these techniques may be applied to other types of touch surfaces, such as touch screens.

FIG. 3A illustrates an example touch pad 302 with a portion 304 that is associated with unintentional touch contact. Since the touch pad 302 is relatively close to a keyboard 306, which may cause a user's thumbs or palms to unintentionally contact the touch pad 302, the portion 304 is defined to guard against such unintentional input. In this example, a user may be more likely to unintentionally contact the edges or perimeter of the touch pad 302, in comparison to a center portion 308. Thus, a touch contact that is received within the portion 304 may be classified as unintentional, or more heavily weighted toward unintentional, while a touch contact within the center portion 308 may be classified as intentional, or more heavily weighted toward intentional. In the example of FIG. 3A, a touch contact may refer to a tap contact having no movement or relatively little movement (e.g., below a threshold), in contrast to a swipe contact (e.g., a touch contact with a particular amount of movement or in a particular direction).

In the example of FIG. 3A, the touch pad 302 is offset from the keyboard 306. In particular, the touch pad 302 is associated with a vertical offset 310 (e.g., distance between a horizontal edge of the touch pad 302 and a horizontal edge of the keyboard 306) and a horizontal offset 312 (e.g., distance between a vertical line passing through a center of the keyboard 306 and a vertical line passing through a center of the touch pad 302). In some instances, a manufacture of a computing device (e.g., a laptop manufacture) may provide these offsets 310 and 312 to be used by the classification module 114.

The offsets 310 and/or 312 may be used to define the portion 304 of the touch pad 302. In the example of FIG. 3A, the portions 304(a) and 304(b) may be defined so that a distance (e.g., a distance 314) between a vertical line that passes through a center of the touch pad 302 and an edge of the portion 304(a) or (b) is proportional to the horizontal offset 312. Here, since the touch pad 302 is offset to the right of the keyboard 306, a user may be more likely to inadvertently contact a right side of the touch pad 302 than a left side of the touch pad 302. Accordingly, the portion 304(b) may be defined to be larger than the portion 304(a) (e.g., extends further toward the center of the touch pad 302). In one illustrative and non-limiting example, the portions 304(a) and 304(b) may be defined so that, when the horizontal offset 312 is zero, the distance 314 is a particular amount+the vertical offset 310.

In a similar manner, the portion 304(c) may be defined based on the offsets 310 and/or 312. For instance, the portion 304(c) may be defined to be any portion of the touch pad 302 that is within a top defense zone of 15 mm from the keyboard 306 (defined by a distance 316). In other words, if the vertical offset 310 is 8 mm, then the upper most 7 mm of the touch pad 302 may be associated with unintentional touch contact, while if the vertical offset 310 is greater than 15 mm, the touch pad 302 may not include a top portion that is associated with unintentional touch contact. In sum, the portion 304(c) may shrink as the location of the touch pad 302 moves further away from the keyboard 308 in the vertical direction (e.g., as the vertical offset 310 increases).

Although the examples discussed above define dimensions of the portion 304 of the touch pad 302 based on specific correlations to the offsets 310 and/or 312, these examples are merely illustrative. In other examples, the portion 304 may be defined through different correlations to the offsets 310 and/or 312. Alternatively, or additionally, the portion 304 may be defined based on different information. In one illustration, the portion 304 may be defined based on a dominant hand of a user (e.g., right-handed or left-handed). If a correlation has been identified for more unintentional touch contact on a left side of the touch pad 302 for right-handed users, then the portion 304(a) may be larger than the portion 304(b) for right-handed users of the touch pad 302.

In some instances, the portions 304(a), 304(b), and 304(c) may be associated with different degrees of unintentional touch contact. As illustrated in FIG. 3A, the portion 304(c) is illustrated with a different type of shading than the portions 304(a) and (b) to indicate that the portion 304(c) may be associated with a higher degree of unintentional input. If, for example, the regions 310(a), 310(b), and 310(c) are each separately included in a function that classifies touch contact, the region 304(c) may be associated with a larger weighting. Although not illustrated in FIG. 3A, in some instances a degree of unintentional touch contact may be based on a distance to a particular point, such as a distance of a touch contact to an upper right hand corner (e.g., further distances would be associated with a higher degree of unintentional input).

FIG. 3B illustrates an example touch pad 318 with a portion 320 that is associated with unintentional touch contact. Here, the touch pad 318 is positioned below an ergonomic keyboard 322 having a bent shape. In this example, the portions 320(a) and (b) are adapted to the configuration of the keyboard 322. As illustrated, the portions 320(a) and (b) are larger toward an upper portion of the touch pad 318 (e.g., closer to the keyboard 322) and smaller toward the bottom portion. This may account for inadvertent touch contact that is more likely to occur at the upper portion of the touch pad 318 than the lower portion. Since there is no horizontal offset between the touch pad 318 and the keyboard 322 in the example of FIG. 3B, the portions 320(a) and (b) may have the same dimensions.

In some instances when classifying a touch contact, an initial location of the touch contact may take priority over any location where the touch contact moves. For example, a touch contact that initially contacts the portion 320(a) and moves to a central portion 324 of the touch pad 318 that is not associated with inadvertent touch contact, may be classified as unintentional based on the initial location of the touch contact. Meanwhile, in other instances the touch contact may be classified based on a current location of the touch contact.

Further, in some instances a touch classification may be based on information from an auxiliary sensor 326. In FIG. 3B, the auxiliary sensors 326(a) (illustrated with filled in black circles) are included in a casing alongside the touch pad 318, while the auxiliary sensors 326(b) (illustrated with dotted circles) are included in the keyboard 322. The auxiliary sensors 326(a)-(b) may provide proximity information about objects relative to a device that includes the keyboard 322 and the touch pad 318. By analyzing information from the auxiliary sensor 326(a)-(b), a touch contact may be accurately classified. If, for example, the auxiliary sensor 326(b) indicates that a user's hand is positioned above the keyboard 322, indicating that the user intends to provide input through the keyboard 322, then a touch contact on the touch pad 318 may be classified as unintentional.

Figure 4:
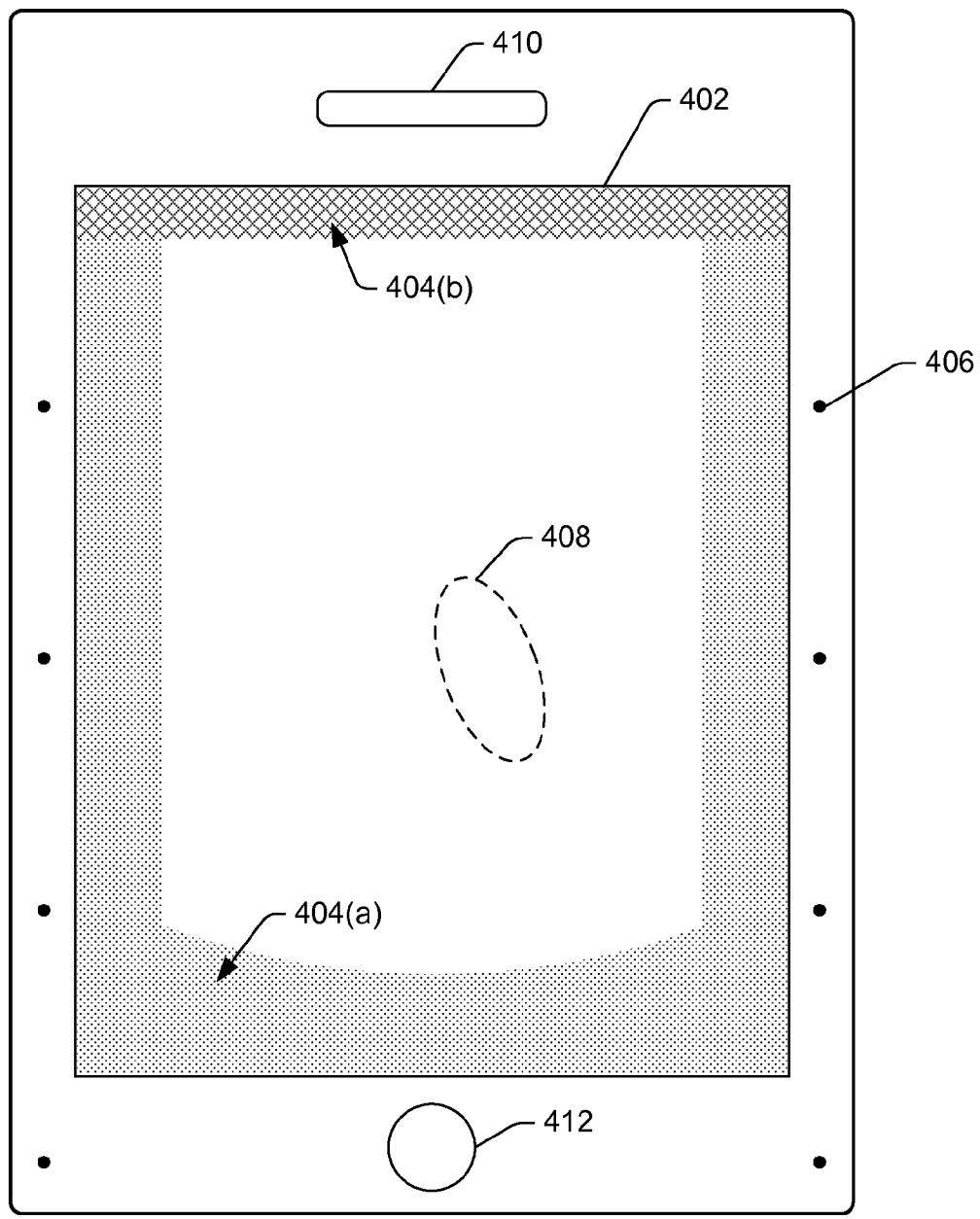
FIG. 4 illustrates example techniques for classifying touch contacts that are received via a touch screen.

FIG. 4 illustrates example techniques for classifying touch contacts that are received via a touch screen. Although these techniques are discussed in the context of a touch screen, the techniques may be implemented with other types of touch surfaces, such as touch pads.

In this example, a touch screen 402 includes a portion 404 that is associated with unintentional touch input. That is, a touch contact that is received within the portion 404 may be classified as unintentional. Here, the portion 404(a) may be associated with a higher likelihood of unintentional input than the portion 404(b), as illustrated by the different types of shading. This may be due to the fact that the touch screen 402 extends relatively close to vertical edges of the device that houses the touch screen 402. The width of the portion 404(a) may be increased when the touch screen 402 extends further to an edge of the device.

As illustrated in FIG. 4, auxiliary sensors 406 may be positioned along an outer perimeter of the device to detect a position of a user's hand. This information may be useful in classifying a touch contact. If, for instance, an auxiliary sensor indicates that a user is gripping the device with his left hand and a touch contact is received along the left-side of the touch screen 402, the touch contact may be classified as unintentional, since it is likely that the user's gripping of the device caused the touch contact.

As discussed above, in some instances a touch contact may be classified based on geometry information. The example of FIG. 4 shows an area 408 of the touch screen 402 that is contacted and identified from geometry information. Here, the touch contact may be identified as unintentional if the area 408 is larger than a threshold, such as larger in area than an average area of a user's finger tip. Additionally, or alternatively, the touch contact may be classified based on pressure information of the touch contact (e.g., whether or not the pressure is above a threshold). Additionally, or alternatively, a principal axis of the touch ellipse geometry of the touch contact may be used to determine whether or not the touch contact contradicts (e.g., is incompatible with) a holding position of the device that is determined using an accelerometer and/or gyroscope. To illustrate, if it is determined that the device is oriented on a horizontal surface (e.g., a table) with the touch screen 402 parallel to the horizontal surface, and the principal axis of the geometry of the touch contact is compatible with this determination (e.g., the axis extends in a diagonal direction across the touch screen 402), then the touch contact may be classified as intentional.

As illustrated in FIG. 4, the device that houses the touch screen 402 may include a speaker 410 to output audio, such as audio of a telephone conversation, and a button 412 to carry out any associated operation, such as returning to a home screen.

FIGS. 5A and 5B illustrates example techniques for classifying touch contacts based on application information related to applications that are currently running.

In FIG. 5A, a classification of a touch contact may be based on application information that indicates that a device 500 is running a gaming program or a gaming application. Here, the device 500 may display game content through a screen 502 of the device 500. If, for instance, it is determined that the game application and/or game content is generally associated with keyboard input (e.g., a game requires keyboard input), then a touch contact that is received through a touch pad 504 may be suppressed (e.g., classified as unintentional). This may include suppressing contact received anywhere on the touch pad 504 or within a particular portion of the touch pad 504, such as within a portion 506. In contrast, if it is determined that the game application and/or game content that is currently displayed is associated with multiple modes of input (e.g., touch pad and keyboard input), then a touch contact that is received through the touch pad 504 may be classified as intentional. Here, the rules and/or weightings may be configured to allow such a classification.

Alternatively, or additionally, in some instances a classification of a touch contact may be based on peripheral devices that are currently being used for an application. For instance, if it is determined that the user is using a peripheral pointing device (e.g., a mouse) while playing the game on the device 500, then a touch contact that is received through the touch pad 504 may be classified as unintentional, since the user would likely not use two types of pointing devices at the same time. Further, if it is determined that the user is using a particular section of a keyboard 508 while playing the game, such as a ten-key section 510, then a touch contact may be classified as intentional, since the user's hands are positioned to the side of the touch pad 504 and any touch contact on the touch pad 504 was likely intentional.

Although the examples of FIG. 5A describe classifying touch contacts for a game application, in other examples the classification may be made for other types of applications. For instance, if a word processing application is running, which may generally be associated with keyboard input, a touch contact may be suppressed.

In FIG. 5B, a classification of a touch contact may be based on application information that indicates the type of content that is being interacted with by a user. If, for instance, the user is interacting with a field control 512, namely an input field for numbers, then a touch contact on the touch pad 504, or within a particular portion of the touch pad 504, may be classified as unintentional. Alternatively, if the user has selected a field control 514, namely a drop down menu, then a touch contact on the touch pad 504 may be classified as intentional, since a user is likely to use a pointer to select an option in the field control 514. Although the example of FIG. 5B describes classification techniques for particular types of field controls, these techniques may be similarly applied to other types of interface elements and/or displayable content.

Example Processes

Figure 6A:
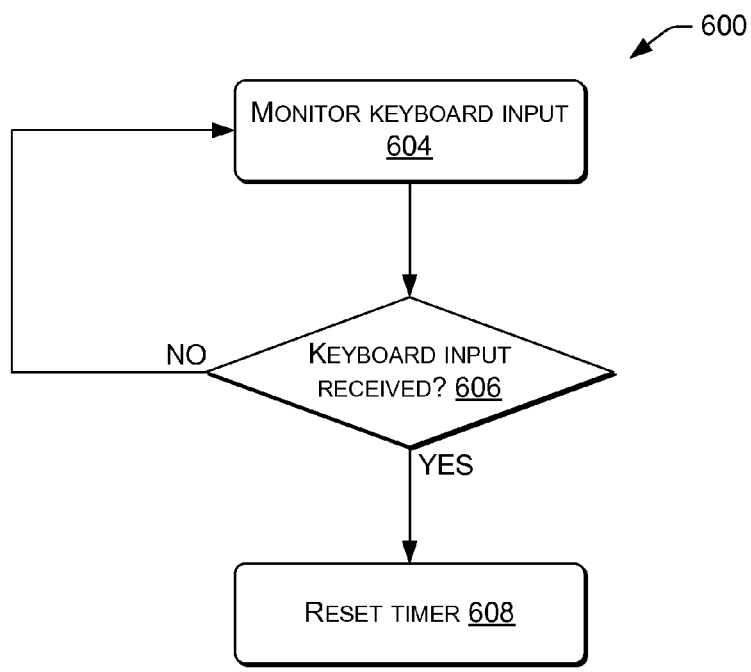
FIGS. 6A and 6B illustrate example processes for classifying a touch contact based on keyboard input history.
Figure 6B:
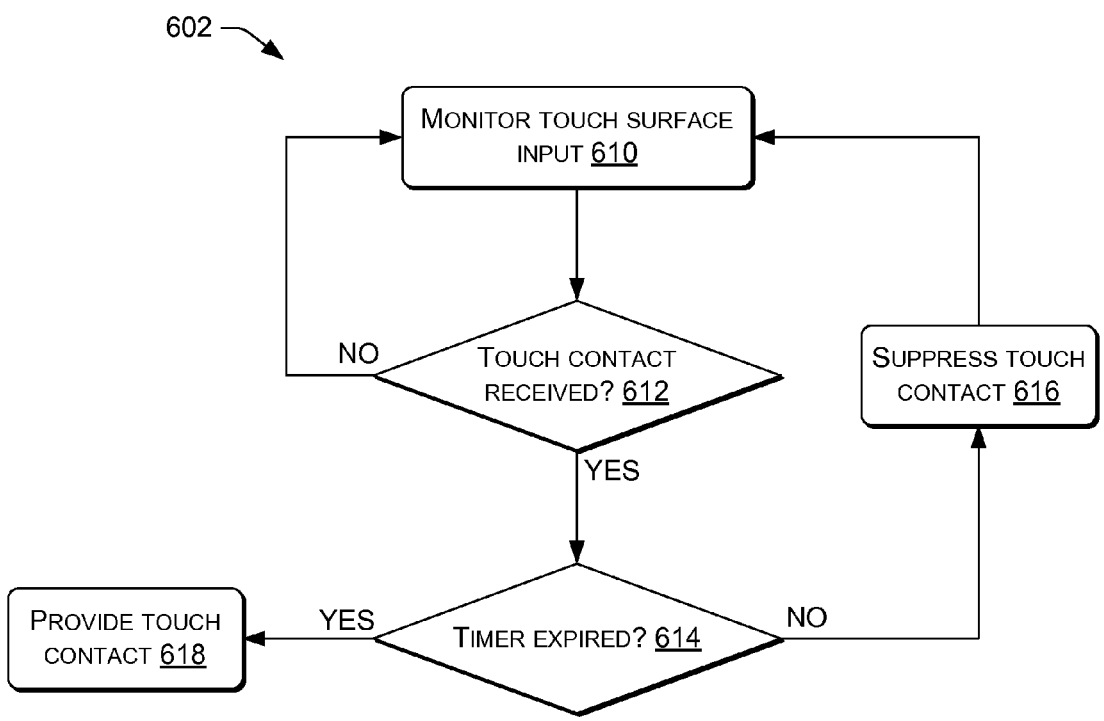
Figure 7:
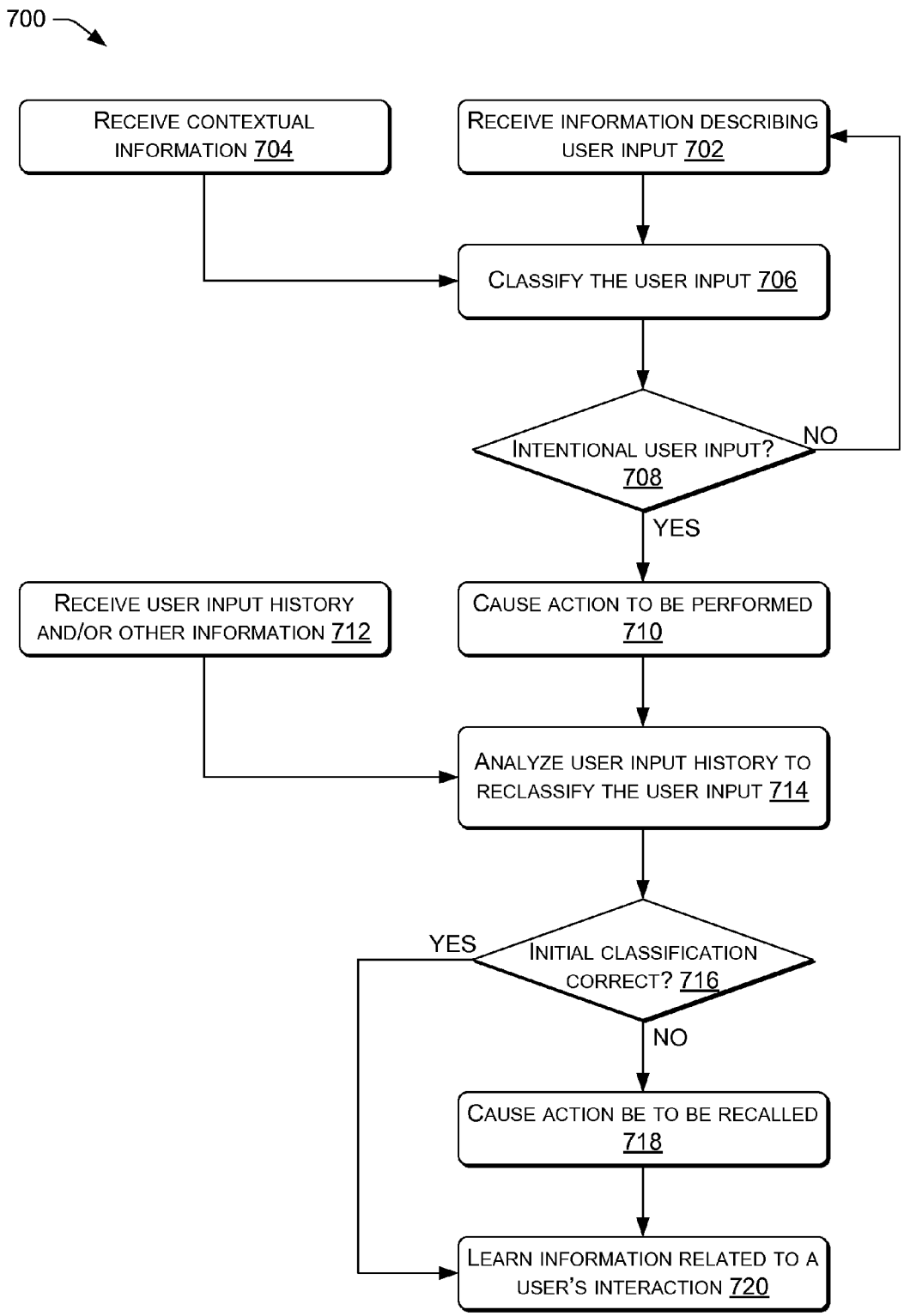
FIG. 7 illustrates an example process for classifying user input.
Figure 8:
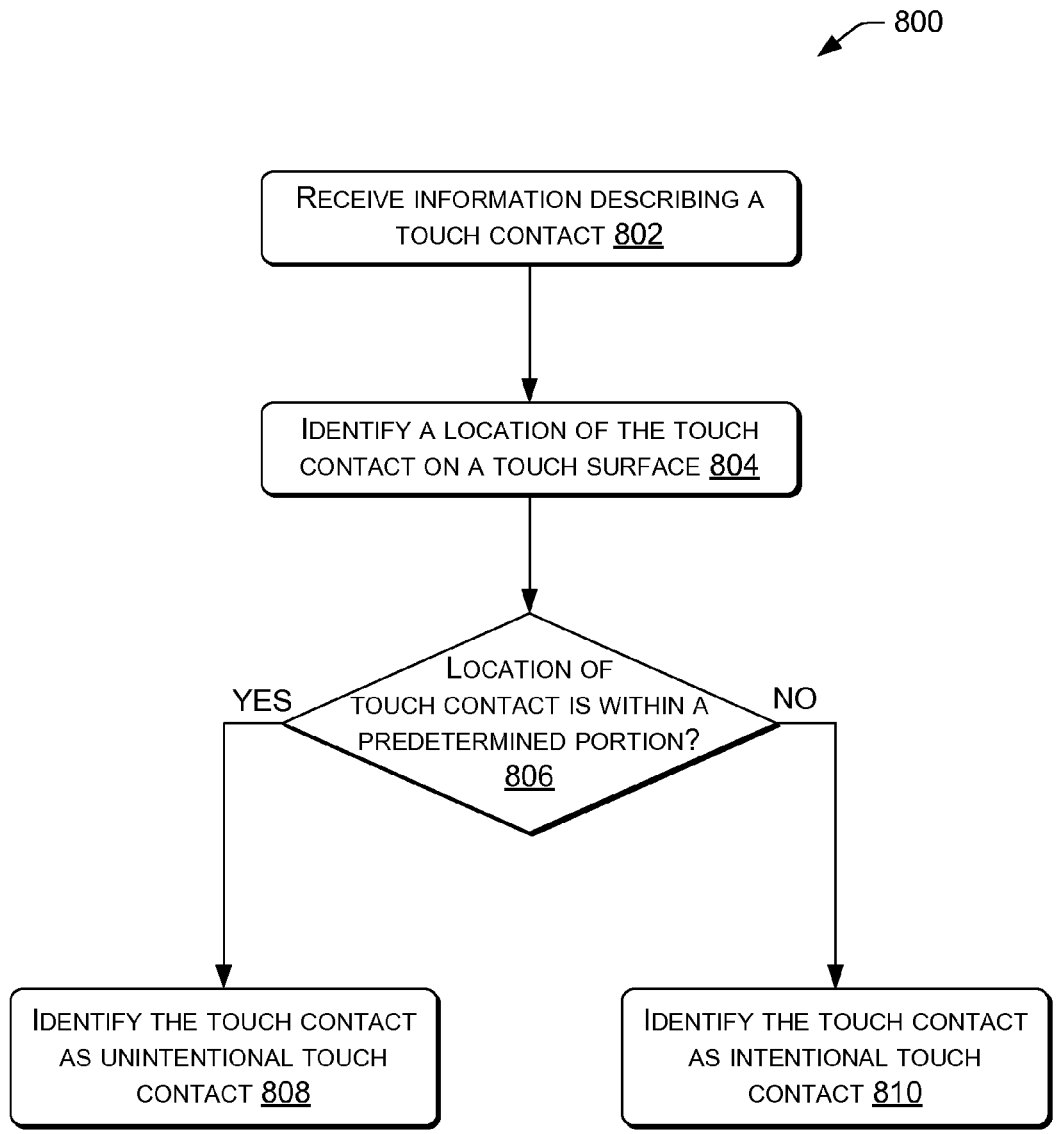
FIG. 8 illustrates an example process for classifying a touch contact based on a location of the touch contact on a touch surface.

FIGS. 6, 7, and 8 illustrate example processes 600, 602, 700, and 800 for employing the techniques described herein. For ease of illustration processes 600, 602, 700, and 800 are described as being performed in the architecture 100 of FIG. 1. For example, one or more of the individual operations of the processes 600, 602, 700, and 800 may be performed by the device 102 and/or the service provider 122. However, processes 600, 602, 700, and 800 may be performed in other architectures. Moreover, the architecture 100 may be used to perform other processes.

The processes 600, 602, 700, and 800 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the individual operations may be omitted.

FIGS. 6A and 6B illustrate example processes 600 and 602 for classifying a touch contact based on keyboard input history. In these example processes, a timer may be used to classify the touch contact. The timer may be used to infer if a user is still using a keyboard when a touch contact is received.

FIG. 6A illustrates the example process 600 for resetting a timer when keyboard input is received. At 604, the device 102 may monitor keyboard input received through the keyboard 108. This may include monitoring signals from keys/buttons of the keyboard 108. At 606, the device 102 may determine whether keyboard input has been received. In some instances, at 606, the device 102 may determine whether a particular type of keyboard input is received, such as "qualified" keyboard input (e.g., an alphanumerical key). When keyboard input has not been received, the process 600 may return to operation 604 and continue to monitor keyboard input. When keyboard input has been received, the process 600 may proceed to operation 608 where the device 102 may reset a timer (e.g., set the timer back to its initial value).

The timer may be configured to count down from a particular value to zero. In some instances, the timer is configured based on keyboard input history. To illustrate, the timer may count down from an average amount of time it takes users to intentionally switch between using the keyboard 108 (e.g., contacting a qualified key) and using the touch surface 112. This may include an amount of time between providing keyboard input and providing a touch contact on the touch surface 112 with a particular finger. In some instances, the timer may be configured for a particular user. That is, the timer may be set based on keyboard input history of the particular user, which may create a personalized user experience.

FIG. 6B illustrates the example process 602 for determining when to allow a touch contact to trigger the performance of an action. At 610, the device 102 may monitor the touch surface 112 to identify touch surface input, namely a touch contact. This may include monitoring signals from the touch surface 112. At 612, the device 102 may determine whether a touch contact has been received through the touch surface 112. In some instances, this may include determining whether a touch contact was received within a particular portion of the touch surface 112 (e.g., within the portion 304 of FIG. 3A), while in other instances this may include determining whether the touch contact was received anywhere on the touch surface 112. When a touch contact has not been received, the process 602 may return to operation 610 and continue to monitor touch surface input. When a touch contact has been received, the process 602 may proceed to operation 614.

At 614, the device 102 may determine if the timer from the process 600 of FIG. 6A has expired. If the timer has not expired, which may indicate that the user is still using the keyboard 108, the device 102 may suppress the touch contact at 616 and return to operation 610. That is, the touch contact may be classified as unintentional and the performance of an associated action may be avoided. Alternatively, if the timer has expired, which may indicate that the user has finished using the keyboard 108, at 618 the device 102 may provide the touch contact to an entity, such as an application, server, and so on. This may cause the performance of an action to be triggered, such as moving a pointing cursor, selecting an icon, and so on.

FIG. 7 illustrates the example process 700 for classifying user input (e.g., a touch contact or air input). As noted above, the process 700 may be performed by the device 102. For ease of illustration, many of the operations of the process 700 are described as being performed by the classification module 114 of the device 102.

At 702, the classification module 114 may receive information that describes user input (e.g., a touch contact on the touch surface 112). This may include receiving a signal from the touch surface 112 about a touch contact and/or a signal from a camera about air input. At 704, the classification module 114 may receive contextual information related to the user input and/or the device 102. The contextual information may be received from the keyboard 108, the auxiliary sensor 110, the touch surface 112, a camera, a data store, or any other source.

At 706, the classification module 114 may classify the user input as intentional or unintentional based on the contextual information. In one example, the classification module 114 may analyze keyboard input history and information about a touch contact or air input to determine an amount of time between receiving the touch contact or air input and receiving input through the keyboard 108. When the amount of time is more than a threshold amount of time, the touch contact or air input may be classified as intentional. In another example, the classification module 114 may analyze application information to identify an application that is currently running. If a particular type of application is running (e.g., a game), a touch contact may be classified as intentional.

At 708, the classification module 114 may determine whether or not the user input was classified as intentional. When classified as unintentional, the process 700 may return to operation 702 to receive further information describing user input. When classified as intentional, the process 700 may proceed to operation 710 to cause an action to be performed. In some instances, operation 710 may include providing the information about the user input to an application or other entity so that the application or other entity may perform the action.

At 712, the classification module 114 may receive user input history of the user input and/or other information (e.g., contextual information in some cases). The user input history may indicate, for example, a duration of time that the touch contact was on the touch surface 112, a velocity of the touch contact on the touch surface 112, a path of the touch contact on the touch surface 112, a duration of time that air input was maintained at a particular position, a velocity of the air input (e.g., how fast a user's hand was moving), a path of the air input in the air, and so on.

At 714, the classification module 114 may analyze the user input history, and other information in some cases, to reclassify the user input. For example, if the user input history indicates that a touch contact, which was initially classified as intentional, was on the touch surface 112 for less than a particular amount of time, then the touch contact may be reclassified as unintentional.

At 716, the classification module 114 may determine whether or not the initial classification of the user input at operation 706 was correct (e.g., an accurate classification).

For example, the classification module 114 may determine if a probability that a touch contact was incorrectly classified exceeds a threshold. If the initial classification was incorrect (e.g., the probability exceeds the threshold), then the process 700 may proceed to 718. Alternatively, if the initial classification was correct, the process 700 may proceed to 720.

At 718, the classification module 114 may cause the action that was triggered from the initial classification to be recalled. This may include sending an instruction to an application or other entity to cancel the performance of the action and/or to undo the action (e.g., by performing an action to reverse the previously performed action).

At 720, the learning module 116 may learn information related to a user's interaction with at least one of the touch surface 112, an input device for receiving air input, or a keyboard associated with the touch surface 112. The information may include, for example, an average typing rate of the user, how soon after typing the user uses the touch surface 112, a characteristic about a hand of the user, and/or touch path patterns to be classified as unintentional/intentional.

FIG. 8 illustrates the example process 800 for classifying a touch contact based on a location of the touch contact on a touch surface. As noted above, the process 800 may be performed by the device 102. For ease of illustration, many of the operations of the process 800 are described as being performed by the classification module 114.

At 802, the classification module 114 may receive information that describes a touch contact on the touch surface 112. This may include receiving a signal from the touch surface 112 about a touch contact. At 804, the classification module 114 may identify a location of the touch contact on the touch surface 112 based on the information. This location may represent an "absolute location" of the touch contact, meaning a location on the touch surface 112 instead of a location of a pointer cursor or other visually displayed element on a display.

At 806, the classification module 114 may determine if the location of the touch contact is within a predetermined portion of the touch surface 112 (e.g., the portion 304 of FIG. 3A). The predetermined portion may comprise an outer portion of the touch surface 112. In some instances, the predetermined portion of the touch surface 112 is defined based on a first offset between the touch surface 112 and the keyboard 108 and/or a second offset between the touch surface 112 and the keyboard 108. The first offset may extend along a line that is substantially perpendicular to a line along which the second offset extends.

If the location of the touch contact is within the predetermined portion of the touch surface 112, then the touch contact may be identified as unintentional touch contact (e.g., inadvertent input) at 808. In contrast, if the location of the touch contact is not within the predetermined portion, then the touch contact may be classified as intentional touch contact at 810.

Although not illustrated in FIG. 8, in some instances the classification module 114 may additionally utilize keyboard input history to classify the touch contact. For example, the classification module 114 may only classify the touch contact as unintentional when an amount of time between receiving the touch contact and receiving a most recent keyboard input is less than a threshold amount of time. If more than the threshold amount of time has passed, this may indicate that the user intended to make contact within the predetermined portion.

Conclusion

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
 a touch device to receive a touch contact;
 one or more processors configured to be communicatively coupled to the touch device;
 memory configured to be communicatively coupled to the one or more processors;
 a first classification module stored in the memory and executable by the one or more processors to determine a classification of the touch contact based at least in part on contextual information, the classification indicating that the touch contact is intentional or unintentional, the contextual information comprising keyboard input history of a keyboard configured to be in communication with the system; and
 a second classification module stored in the memory and executable by the one or more processors to determine whether the classification of the touch contact is accurate based, at least in part, on a history of the touch contact.

2. The system of claim 1, wherein the touch device comprises at least one of a touch pad or a touch screen.

3. The system of claim 1, wherein the contextual information further comprises at least one of location information of the touch contact that indicates a location of the touch contact relative to a predetermined portion of the touch device, a confidence value of the touch contact that is determined by the touch device, geometry information of the touch contact that indicates a size or shape of the touch contact, or hand position information that indicates a position of a hand of a user relative to the system.

4. The system of claim 1, wherein the contextual information further comprises at least one of application information related to an application that is running on the system, or information that indicates a number of substantially simultaneous touch contacts on the touch device.

5. The system of claim 1, wherein the classification of the touch contact is determined based at least in part on whether the touch contact is within a predetermined portion of the touch device.

6. The system of claim 5, wherein:
 the predetermined portion of the touch device includes first and second portions; and
 the classification of the touch contact indicates a degree of unintentional contact of the touch contact, the degree of unintentional contact being based, at least in part, on whether the touch contact is within the first portion or the second portion.

7. The system of claim 1, wherein the keyboard input history of the keyboard comprises at least one of:
 an amount of time between receiving a most recent keyboard input and receiving the touch contact; or
 a number of keyboard inputs received over a period of time.

8. The system of claim 1, wherein the first classification module is further configured to cause the touch device to perform an action associated with the touch contact; and
 wherein the second classification module is further configured to, in response to determining that the classification of the touch contact is not accurate, undo the action.

9. A method comprising:
 receiving, by a computing device, information that indicates a touch contact on a touch device;

determining, by the computing device, a classification of the touch contact based at least in part on contextual information, the contextual information comprising hand position information that indicates a distance from a hand of a user to the touch device, the classification indicating that the touch contact is intentional or unintentional; and determining, by the computing device, whether the classification of the touch contact is accurate, the determining being based, at least in part, on a history of the touch contact.

10. The method of claim 9, wherein the receiving comprises receiving information from a touch device that includes at least one of a touch pad or a touch screen.

11. The method of claim 9, wherein the contextual information further comprises at least one of location information of the touch contact that indicates a location of the touch contact relative to a predetermined portion of the touch device, a confidence value of the touch contact that is determined by the touch device, or geometry information of the touch contact that indicates a size or shape of the touch contact.

12. The method of claim 9, wherein the contextual information further comprises at least one of application information related to an application that is running on the touch device, keyboard input history of a keyboard associated with the touch device, or information that indicates a number of substantially simultaneous touch contacts on the touch device.

13. The method of claim 9, wherein the classification of the touch contact is determined based at least in part on whether the touch contact is within a predetermined portion of the touch device.

14. The method of claim 9, further comprising receiving, from a sensor associated with at least one of the computing device or the touch device, the hand position information that indicates the distance from the hand of the user to the touch device.

15. One or more computer storage media storing computer-readable instructions that, when executed, instruct one or more processors to perform operations comprising:

identifying information that indicates a touch contact received via a touch device;

determining a classification of the touch contact based at least in part on contextual information, the classification indicating that the touch contact is intentional or unintentional, the contextual information comprising keyboard input history of a keyboard associated with the touch device; and determining whether the classification of the touch contact is accurate based, at least in part, on a history of the touch contact.

16. The one or more computer storage media of claim 15, wherein the touch device comprises at least one of a touch pad or a touch screen.

17. The one or more computer storage media of claim 15, wherein the contextual information further comprises at least one of location information of the touch contact that indicates a location of the touch contact relative to a predetermined portion of the touch device, a confidence value of the touch contact that is determined by the touch device, geometry information of the touch contact that indicates a size or shape of the touch contact, or hand position information that indicates a position of a hand of a user relative to the touch device.

18. The one or more computer storage media of claim 15, wherein the contextual information further comprises at least one of application information related to an application that is running on the system, or information that indicates a number of substantially simultaneous touch contacts on the touch device.

19. The one or more computer storage media of claim 15, wherein the classification of the touch contact is determined based at least in part on whether the touch contact is within a predetermined portion of the touch device.

\* \* \* \* \*